United States Patent
Coleman et al.

(10) Patent No.: US 7,770,607 B2
(45) Date of Patent: Aug. 10, 2010

(54) DOUBLE WEFT/WARP AIRBAG FABRIC AND RELATED AIRBAGS AND MANUFACTURING METHODS

(75) Inventors: James C. Coleman, North Ogden, UT (US); Altay Nihat Kismir, Tilbury (CA)

(73) Assignee: Autoliv ASP, Inc., Ogden, UT (US)

( * ) Notice: Subject to any disclaimer, the term of this patent is extended or adjusted under 35 U.S.C. 154(b) by 878 days.

(21) Appl. No.: 11/507,398

(22) Filed: Aug. 21, 2006

(65) Prior Publication Data

US 2008/0042413 A1 Feb. 21, 2008

(51) Int. Cl.
*D03D 1/04* (2006.01)
(52) U.S. Cl. ...................................... 139/389
(58) Field of Classification Search ................. 139/383, 139/383 R, 389, 389 R, 410, 384 R; 280/728.1, 280/743.1; 442/76, 164, 203; 428/36.1
See application file for complete search history.

(56) References Cited

U.S. PATENT DOCUMENTS

| | | | |
|---|---|---|---|
| 5,011,183 A | 4/1991 | Thornton et al. | 280/743 |
| 5,336,538 A | 8/1994 | Kitamura | 428/35.2 |
| 5,685,347 A | 11/1997 | Graham et al. | 139/390 |
| 5,707,711 A | 1/1998 | Kitamura | 428/193 |
| 6,010,149 A | 1/2000 | Riedel et al. | 280/730.2 |
| 6,220,309 B1 | 4/2001 | Sollars, Jr. | 139/389 |
| 6,488,311 B2 | 12/2002 | Kato et al. | 280/743.1 |
| 6,631,921 B1 | 10/2003 | Brossler et al. | 280/730.2 |
| 6,883,557 B1 | 4/2005 | Eschbach et al. | 139/387 |
| 2003/0189322 A1 | 10/2003 | Stow et al. | 280/79 |

FOREIGN PATENT DOCUMENTS

EP 0 458 838 12/1990

*Primary Examiner*—Arti Singh-Pandey
(74) *Attorney, Agent, or Firm*—Sally J Brown; Stoel Rives, LLP

(57) ABSTRACT

A double yarn airbag fabric is disclosed, which may include an inflatable fabric portion, comprising multiple first yarns that form multiple sets of first yarns, and multiple second yarns. At least two sets of first yarns are alternately woven around at least two adjacent second yarns at each weave. The result of weaving are two opposing woven fabric layers formed from two pairs of the alternating second yarn sets, such that a space to be inflated is formed between the two opposing fabric layers. The two opposing fabric layers may be formed in a continuous weaving process. The fabric also includes a non-inflatable fabric portion by alternately weaving two pairs of alternating first yarn sets around two adjacent second yarns at each weave, to form a single, woven fabric layer. The multiple first yarns may include warp yarns and the multiple second yarns may include weft yarns, or vice versa.

15 Claims, 11 Drawing Sheets

DOUBLE WEFT/WARP AIRBAG FABRIC AND RELATED AIRBAGS AND MANUFACTURING METHODS

TECHNICAL FIELD

The present disclosure relates generally to the field of automotive protective airbags. More specifically, the present disclosure relates to weaving double weft (and double warp) fabric, at least a portion of which is inflatable for incorporation into protective airbags.

BRIEF DESCRIPTION OF THE DRAWINGS

Understanding that the drawings depict only typical embodiments and are not therefore to be considered limiting, the embodiments will be described and explained with additional specificity and detail through the use of the accompanying drawings, in which like components are designated by like numerals throughout.

DETAILED DESCRIPTION

The present disclosure relates to airbag weaving technology as it relates to improving the durability and performance of the fabric comprising airbags, which are designed to deploy quickly and absorb enormous pressure. For instance, in one embodiment, inflation gas is rapidly fed into the airbag by activating a pyrotechnic. The airbag may require sufficient strength to endure the impact force caused by the inflation gas, in addition to arresting the movement of a person within a vehicle.

Currently, airbag designs usually include throat liners and other mechanisms of reinforcement to ensure the airbag as a whole will deploy as intended and yet remain durable. Using two adjacent weft yarns between each weave of alternating sets of warp yarns while weaving airbag fabric increases the durability of the airbag fabric and may potentially eliminate the need for throat liners or other such reinforcements. It is likewise within the scope of this disclosure to include two adjacent warp yarns between each weave of alternating sets of weft yarns to create the same weaving pattern in a similar weaving process. The double weft (or double warp) weaving process also increases weaving efficiency by producing more fabric per unit time because of the additional weft (or warp) yarns used at each weaving step. Both efficiency and durability are also increased through use of a one-piece-weaving ("OPW") process, which simultaneously produces both an inflatable fabric portion and a non-inflatable portion adjacent to the inflatable fabric portion. While the airbag fabric herein is explained in the context of double weft (or double warp) weaving, it is certainly within the scope of this disclosure to use a plurality of wefts (or warps) at each weave throughout the weaving process.

Figure 1:
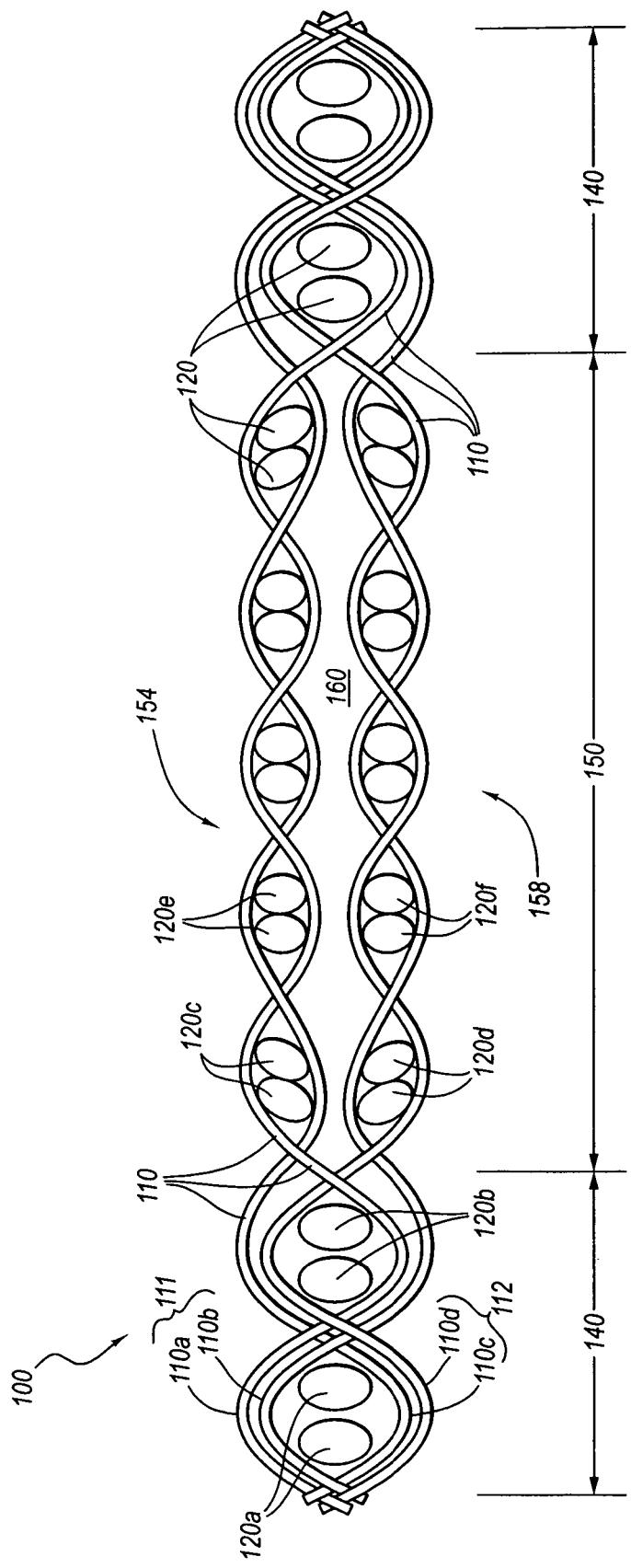
FIG. 1 is a cross section view of a woven airbag fabric.

With reference to the accompanying drawings, FIG. 1 is a cross section view of a woven, double yarn (weft or warp) airbag fabric 100. For simplicity of discussion, the airbag fabric 100 will now be discussed in the context of a double weft pattern, although equally within the scope of this disclosure is the same airbag fabric 100 woven where weft yarns and warp yarns are interchanged in their positions, thus producing a double warp airbag fabric 100. Therefore, specific reference to warp or weft yarns in the below discussion should not limit the scope of the airbag fabric 100 where warp yarns 110 are interchangeable with weft 120 yarns.

A plurality of warp yarns 110 may be interwoven with a plurality of weft yarns 120, the weft yarns 120 being disposed as adjacently abutting weft yarn pairs 120. As displayed, the plurality of warp yarns 110 may include four sets of warp yarns 110, including first and second pairs 111, 112 of warp yarn sets. Although single warp yarn threads 110 are shown, each warp yarn thread 110 may represent a plurality of warp yarns that comprise a warp yarn set. In the actual weaving process of the inflatable fabric, an entire warp yarn set may be positioned in like manner to its corresponding single warp yarn depicted. Consequently, the four warp yarns 110 displays in FIG. 1 represent four sets of warp yarns 110.

In one embodiment, first pair 111 of warp yarn sets may include first and second sets 110a, 110b of warp yarns. Second pair 112 of warp yarn sets may include third and fourth sets 110c, 110d of warp yarns. Double weft airbag fabric 100 is woven by creating two fabric portions, a non-inflatable fabric portion 140, and an inflatable fabric portion 150. When the inflatable fabric portion 150 is weaved, first and second pairs 111, 112 of warp yarn sets may alternately correspond to, respectively, first and third sets 110a, 110c of warp yarns, and second and fourth sets 110b, 110d of warp yarns, as will be described hereafter.

The non-inflatable fabric portion 140 and the inflatable fabric portion 150 is weaved from the same plurality of warp yarns 110 and weft yarns 120, forming an integral, double weft airbag fabric 100 during the OPW process. The non-inflatable fabric portion 140 is thus weaved with first and second warp yarn sets 110a, 110b woven over a first adjacent pair 120a of weft yarns while third and fourth warp yarn sets 110c, 110d are woven under the first adjacent pair 120a of weft yarns. Further, the first and second warp yarn sets 110a, 110b are woven under a second adjacent pair 120b of weft yarns while third and fourth warp yarn sets 110c, 110d are woven under the second adjacent pair 120b of weft yarns. This manner of weaving produces a weaving pattern, which may be repeated to form a desired length of non-inflatable fabric portion 140.

One skilled in the art will appreciate that other ways of alternating weaving warp yarn sets (110a, 110b, 110c, 110d) may create non-inflatable fabric portion 140, such as by weaving one set of warp yarns over a first adjacent pair 120a of weft yarns while weaving the other three sets of warp yarns (or the remainder of the four sets of warp yarns) under the first adjacent pair 120a of weft yarns. Weaving warp yarn sets around a second adjacent pair 120b of weft yarns could follow the one/three split of warp yarn sets, or change back to weaving first and second pairs 111, 112 of warp yarn sets on either side of subsequent pairs 120 of weft yarns. Furthermore, more than four warp yarn sets may be used. Consequently, there are multiple ways to weave the non-inflatable fabric portion 140, which may result in an integral, single piece of woven, double weft fabric.

The inflatable fabric portion 150 may be weaved from the same plurality of warp yarns 110 and weft yarns 120 as used to weave non-inflatable fabric portion 140. That is, first warp yarn set 110*a* is woven over a first adjacent pair 120*c* of weft yarns while third warp yarn set 110*c* is woven under the first adjacent pair 120*c* of weft yarns. Further, first warp yarn set 110*a* may be woven under a second adjacent pair 120*e* of weft yarns while third warp yarn set 110*c* is woven over the second adjacent pair 120*e* of weft yarns. Additionally, second warp yarn set 110*b* is woven over a third adjacent pair 120*d* of weft yarns while fourth warp yarn set 110*d* is woven under the third adjacent pair 120*d* of weft yarns. Further, second warp yarn set 110*b* is woven under a fourth adjacent pair 120*f* of weft yarns while fourth warp yarn set 110*d* is woven over the fourth adjacent pair 120*f* of weft yarns. This manner of weaving produces a weaving pattern, which may be repeated to form a desired length of inflatable fabric portion 150.

In the embodiment depicted, the first and third warp yarn sets 110*a*, 110*c* are alternately woven around pairs 120*c*, 120*e* of adjacent weft yarns to form a first woven fabric layer 154. Likewise, the second and fourth warp yarns sets 110*b*, 110*d* are alternately woven around additional pairs 120*d*, 120*f* of adjacent weft yarns to form an opposing, second woven fabric layer 158. The weaving of first and second opposing, woven fabric layers 154, 158 may occur in parallel and concurrently for efficiency, i.e., during an OPW process. To make inflatable fabric portion 150 of desired length, the weaving of first and second opposing, woven fabric layers 154, 158 is repeated until the desired length is obtained. After inflatable fabric portion 150 is woven in the OPW process, weaving transitions to again form only non-inflatable fabric portion 140, as described previously, thereby forming at least one inflatable space (or cell) 160 between first and second opposing, woven fabric layers 154, 158 and non-inflatable fabric portion 140.

In some applications, the double weft airbag fabric 100 may not require sewing of seams to seal inflatable space 160 because of the strength of the double weft airbag fabric 100. Likewise, the efficiency of the OPW process while weaving two or more adjacent weft yarns 120 at each weave should be appreciated by those having skill in the art. As the OPW process progresses, a plurality of varying shapes and sizes of inflatable spaces 160 may be formed in the fabric 100 having first and second pairs 111, 112 of warp yarn sets. These inflatable spaces 160 may be created by the non-inflatable fabric portion 140 partitioning different areas of inflatable fabric portion 150 through the use of a weaving pattern.

Figure 2:
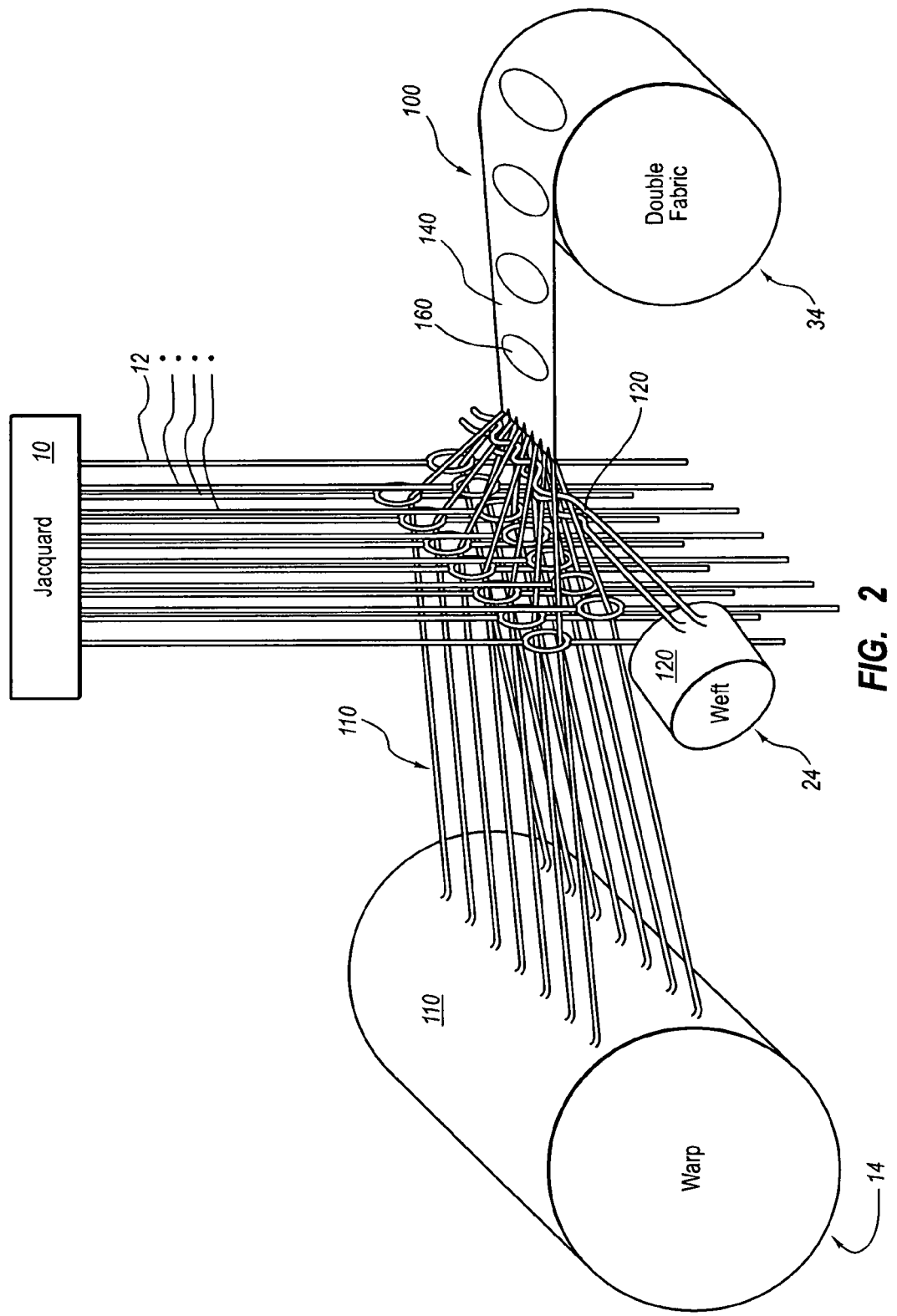
FIG. 2 is a perspective view of a Jacquard Loom and one embodiment of weaving double weft airbag fabric.

FIG. 2 is a perspective view of one embodiment of weaving double yarn (weft or warp) airbag fabric 100 with a loom, such as a Jacquard Loom 10 having a plurality of lifting bars 12. As before mentioned, the warp yarns 110 may be interchangeable with the weft yarns 120 in the double yarn airbag fabric 100. Therefore, although the following embodiment is described in the context of double weft airbag fabric 100, another embodiment of the weaving process includes weaving a plurality of weft yarn sets about pairs of warp yarn sets to produce double warp airbag fabric 100.

Warp yarns sets 110*a*, 110*b*, 110*c*, 110*d* are spun from at least one warp yarn spool 14, although multiple warp yarn spools 14 could be used, for instance, one each for warp yarn set pairs 111, 112. Warp yarns 110 are fed into lifting bars 12 of Jacquard Loom 10. As each set of warp yarns 110 is lifted as directed by a computer or punch card (not shown), a weft yarn spool 24 inserts (or picks) at least two weft yarns 120 through the warp yarn sets 110. Weights (not shown) may be used to batten, or press home, the weft yarns 120 into woven, double weft fabric 100, which exits onto a fabric spool 34. The alternation of the warp yarns 110 and weft yarns 120 to produce double weft airbag fabric 100 was explained briefly in reference to FIG. 1. Note that double yarn (weft or warp) airbag fabric 100, as shown, comprises alternating patterns of non-inflatable fabric portion 140 and inflatable cells 160, which may be used to produce airbags.

Figure 3A:
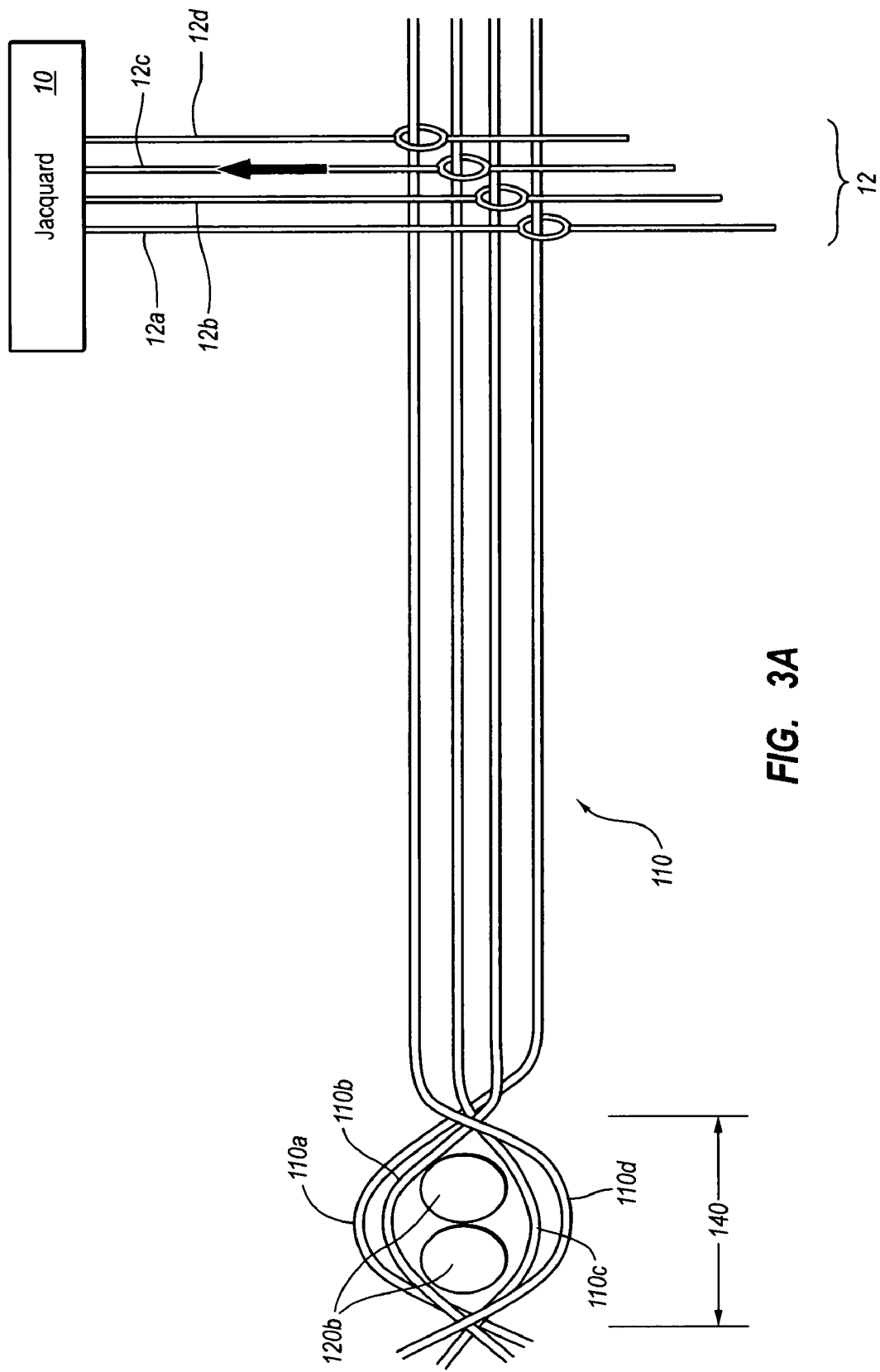
FIG. 3A is a cross section view of a portion of the Jacquard Loom of FIG. 2 depicting four sets of alternating warp yarns interwoven with a first pair of weft yarns formed in a non-inflatable fabric portion.

FIGS. 3A-3G displays a more detailed set of steps that may be used in one embodiment of weaving double weft airbag fabric 100, each showing a cross section view of a portion of Jacquard Loom 10, depicting four sets (110*a*, 110*b*, 110*c*, 110*d*) of alternating warp yarns 110 woven around pairs 120 of weft yarns. FIG. 3A shows the four warp yarn sets interwoven with a pair 120*b* of weft yarns formed in a non-inflatable fabric portion 140. This may provide a starting point before an inflatable fabric portion 150 is woven. As depicted, first and second warp yarn sets 110*a*, 110*b* may be woven over an adjacent pair 120*b* of weft yarns and third and fourth warp yarn sets 110*c*, 110*d* may be woven under the adjacent pair 120*b* of weft yarns. First, second, third, and fourth warp yarn sets 110*a*, 110*b*, 110*c*, 110*d* may be coupled to corresponding first, second, third, and fourth sets 12*a*, 12*b*, 12*c*, 12*d* of lifting bars 12 of Jacquard Loom 10.

Figure 3B:
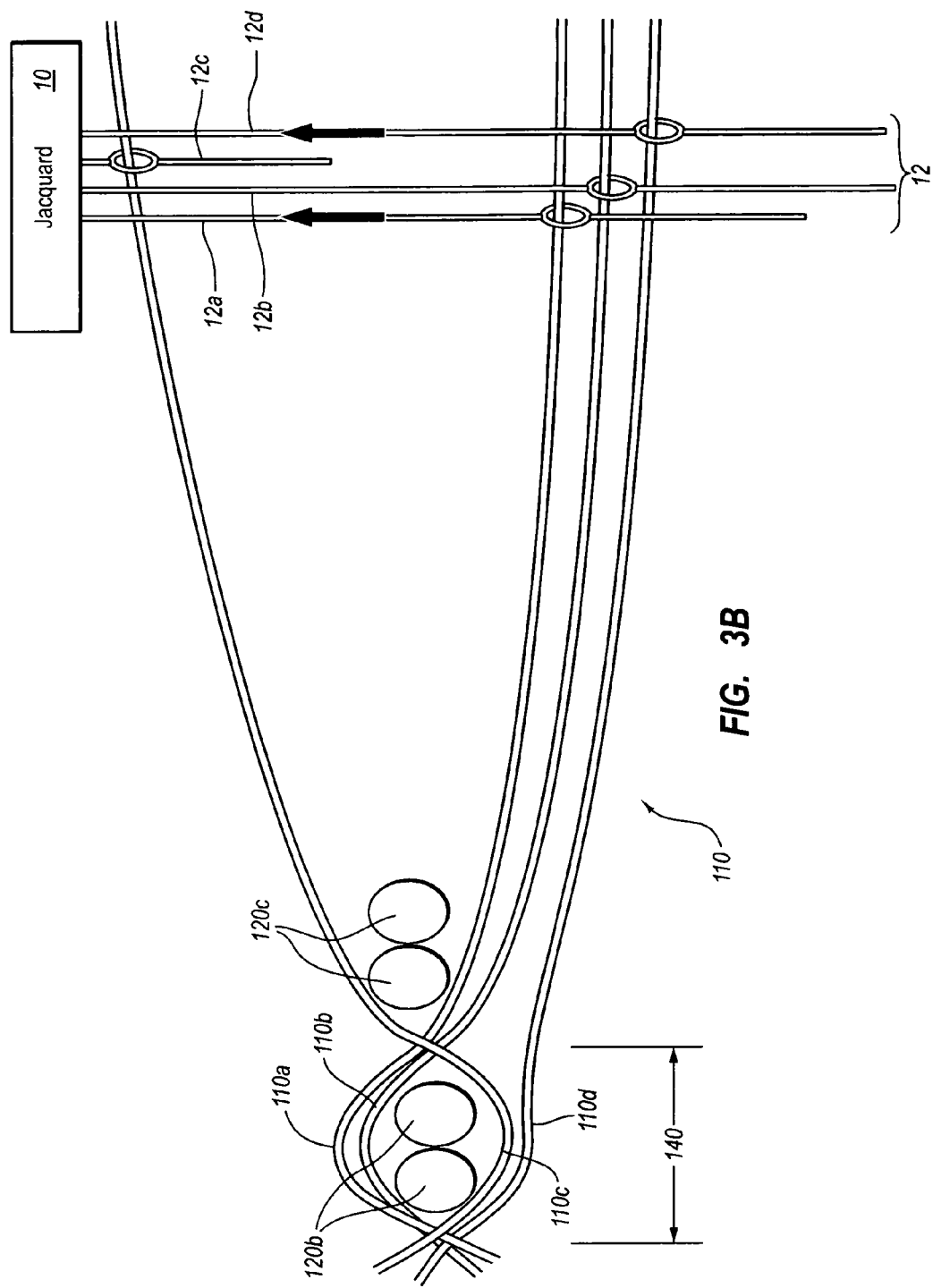
FIGS. 3B-3G are cross section views as in FIG. 3A, displaying one embodiment of a series of steps to form two opposing layers comprising an inflatable portion of an airbag fabric.

FIG. 3B shows a first step to weaving inflatable fabric potion 150 according to one exemplary embodiment. After the third set 12*c* of lifting bars is raised, a first adjacent pair 120*c* of weft yarns is inserted through the gap created between first and third warp yarn sets 110*a*, 110*c*. The arrows superimposed adjacent first and fourth sets 12*a*, 12*d* of lifting bars indicate that these are to be raised in the next step.

Figure 3C:
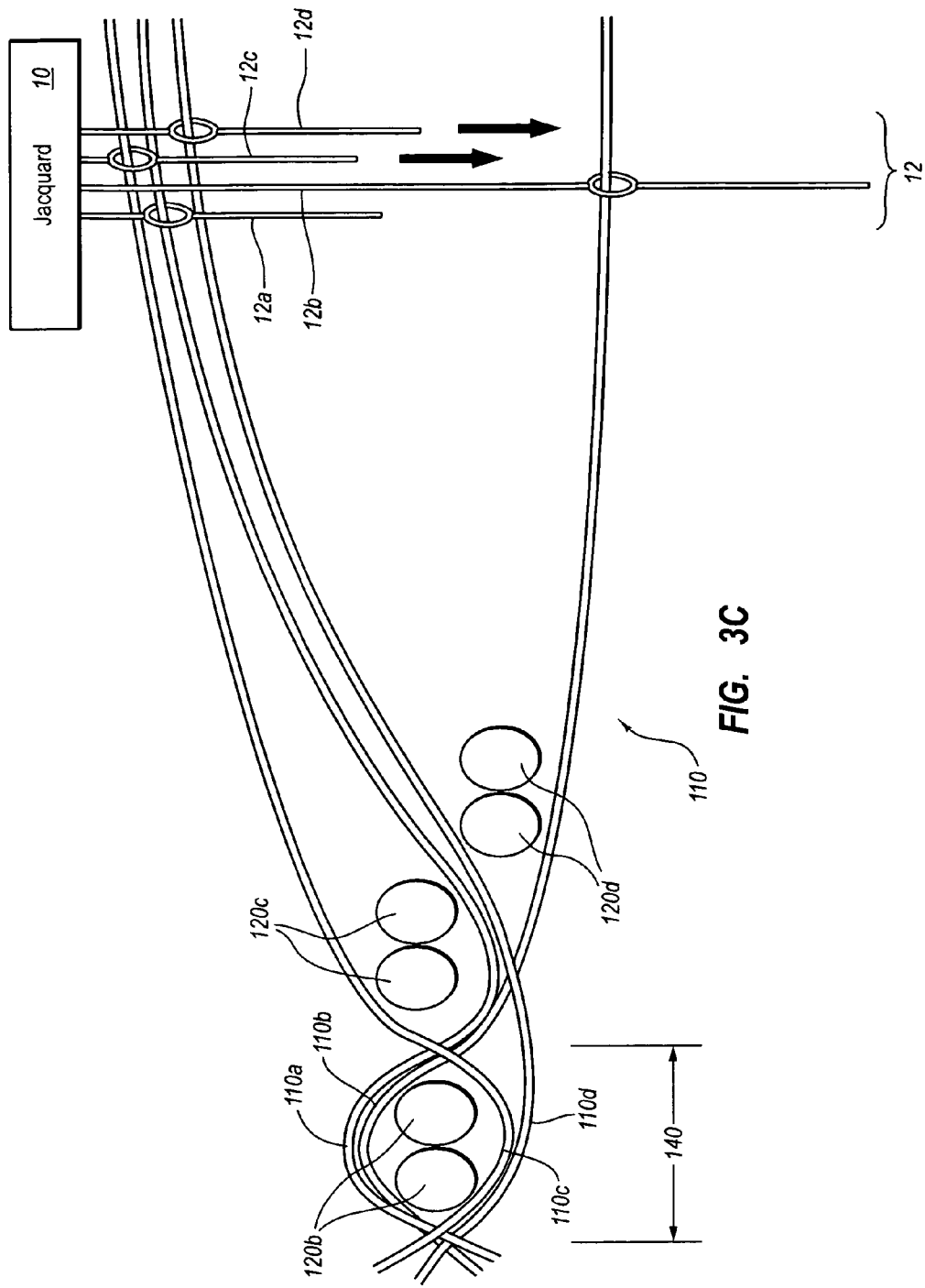

FIG. 3C shows the result of raising first and fourth sets 12*a*, 12*d* of lifting bars, creating another gap, this time between second and fourth warp yarn sets 110*b*, 110*d*, through which is inserted a second adjacent pair 120*d* of weft yarns. The arrows superimposed adjacent third and fourth sets 12*c*, 12*d* of lifting bars indicate that these are to be dropped in the next step.

Figure 3D:
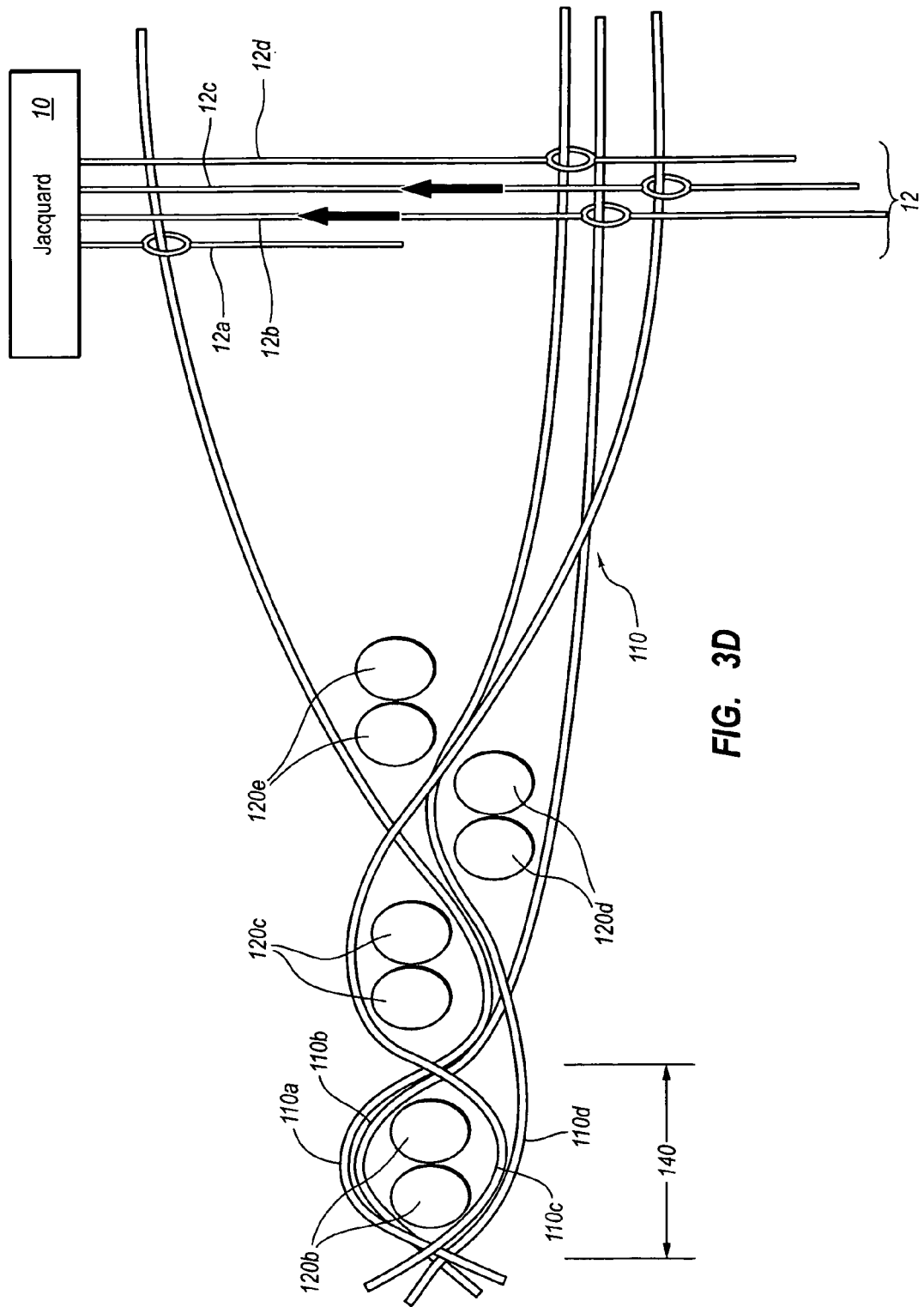

FIG. 3D shows the result of dropping third and fourth sets 12*c*, 12*d* of lifting bars, creating another gap between first and third warp yarns sets 110*a*, 110*c*, through which is inserted a third adjacent pair 120*e* of weft yarns. The arrows superimposed adjacent second and third sets 12*b*, 12*c* of lifting bars indicate that these are to be raised in the next step.

Figure 3E:
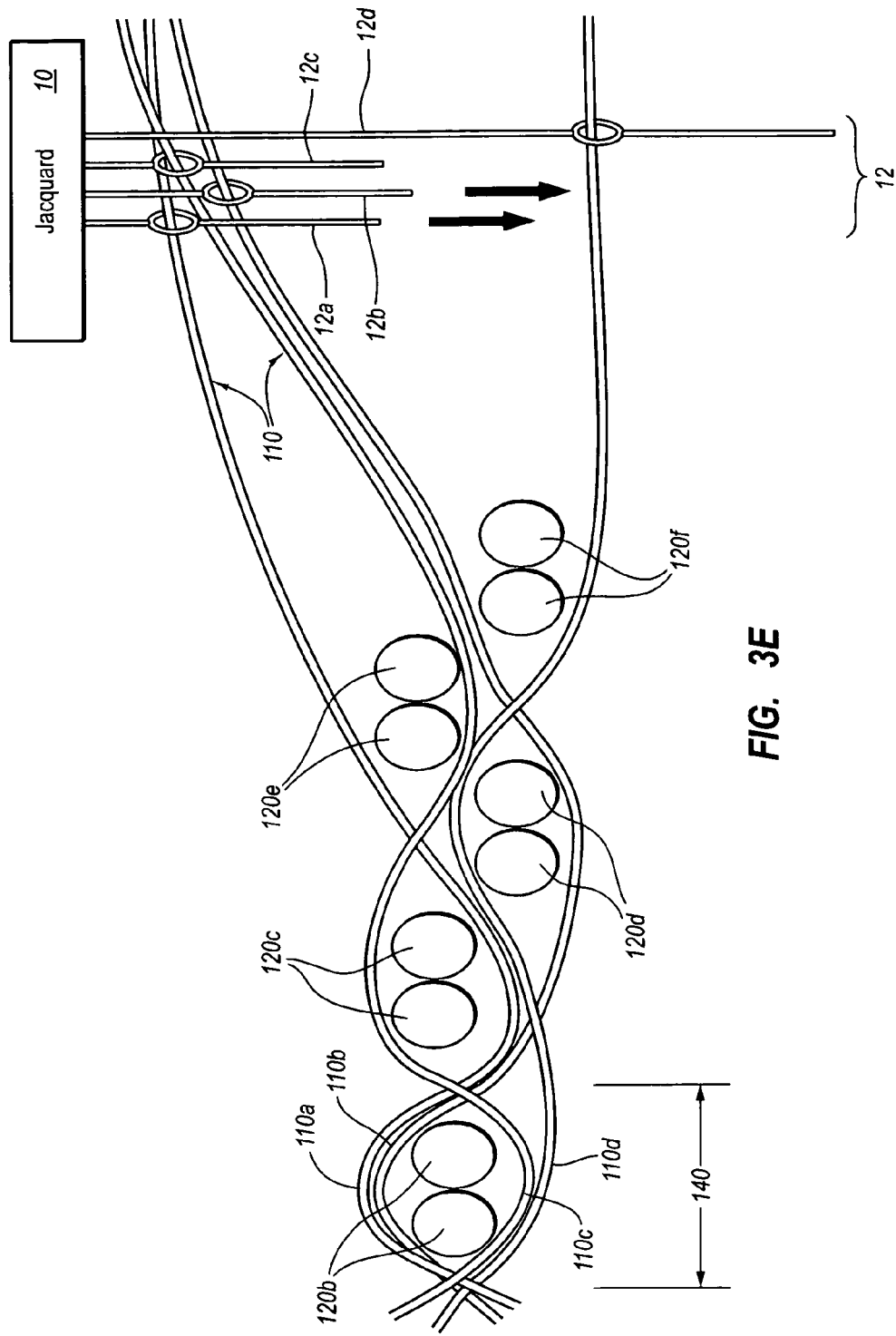

FIG. 3E shows the result of raising second and third sets 12*b*, 12*c* of lifting bars, creating another gap between second and fourth warp yarn sets 110*c*, 110*d*, through which is inserted a fourth adjacent pair 120*f* of weft yarns. The arrows superimposed adjacent first and second sets 12*a*, 12*b* of lifting bars indicate that these are to be dropped in the next step.

Figure 3F:
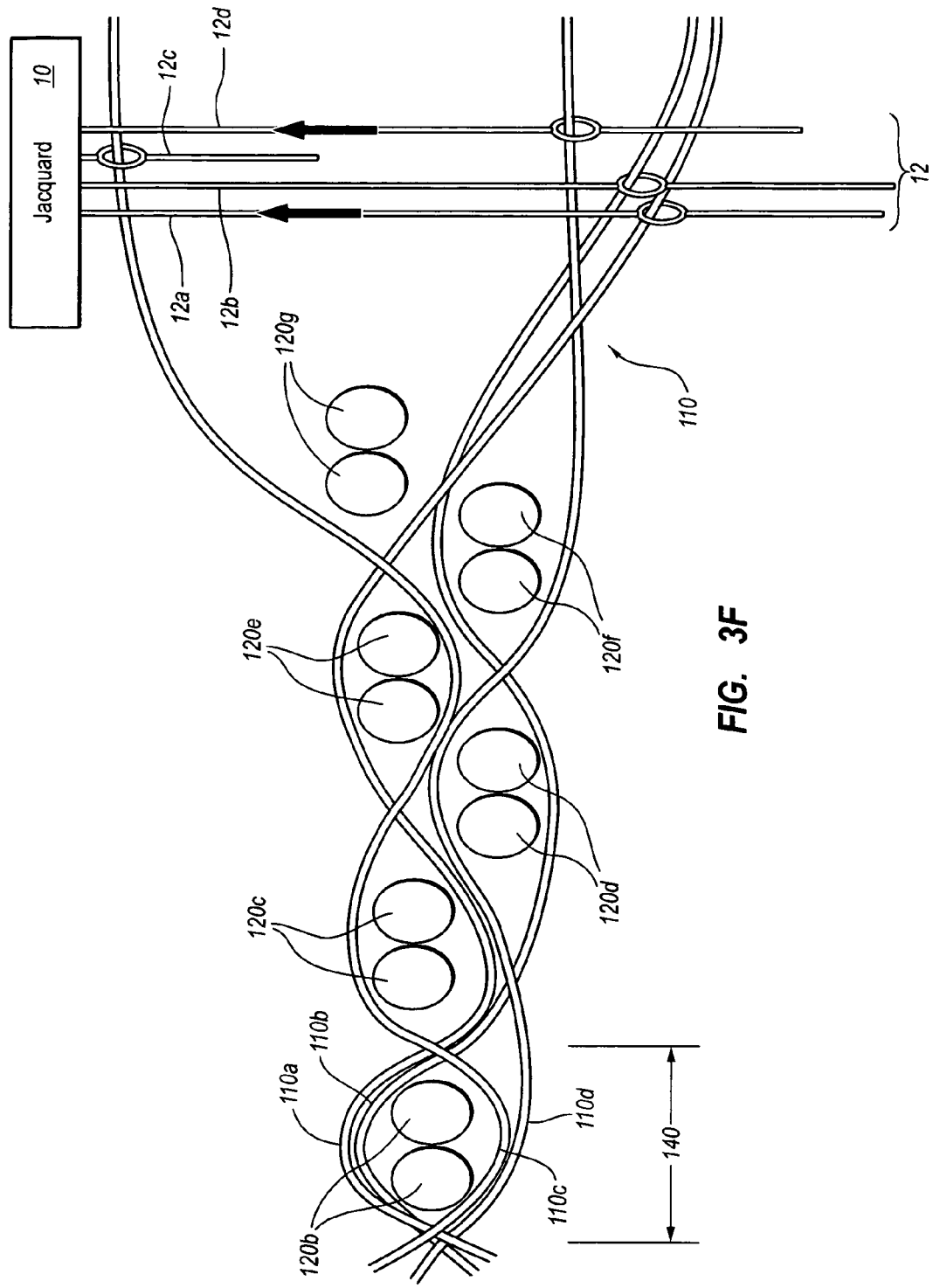

FIG. 3F shows the result of dropping first and second sets 12*a*, 12*b* of lifting bars, creating another gap between first and third warp yarn sets 110*a*, 110*c*, through which is inserted a fifth adjacent pair 120*g* of weft yarns. The arrows superimposed adjacent first and fourth sets 12*a*, 12*d* of lifting pairs indicates these are next to be raised.

Figure 3G:
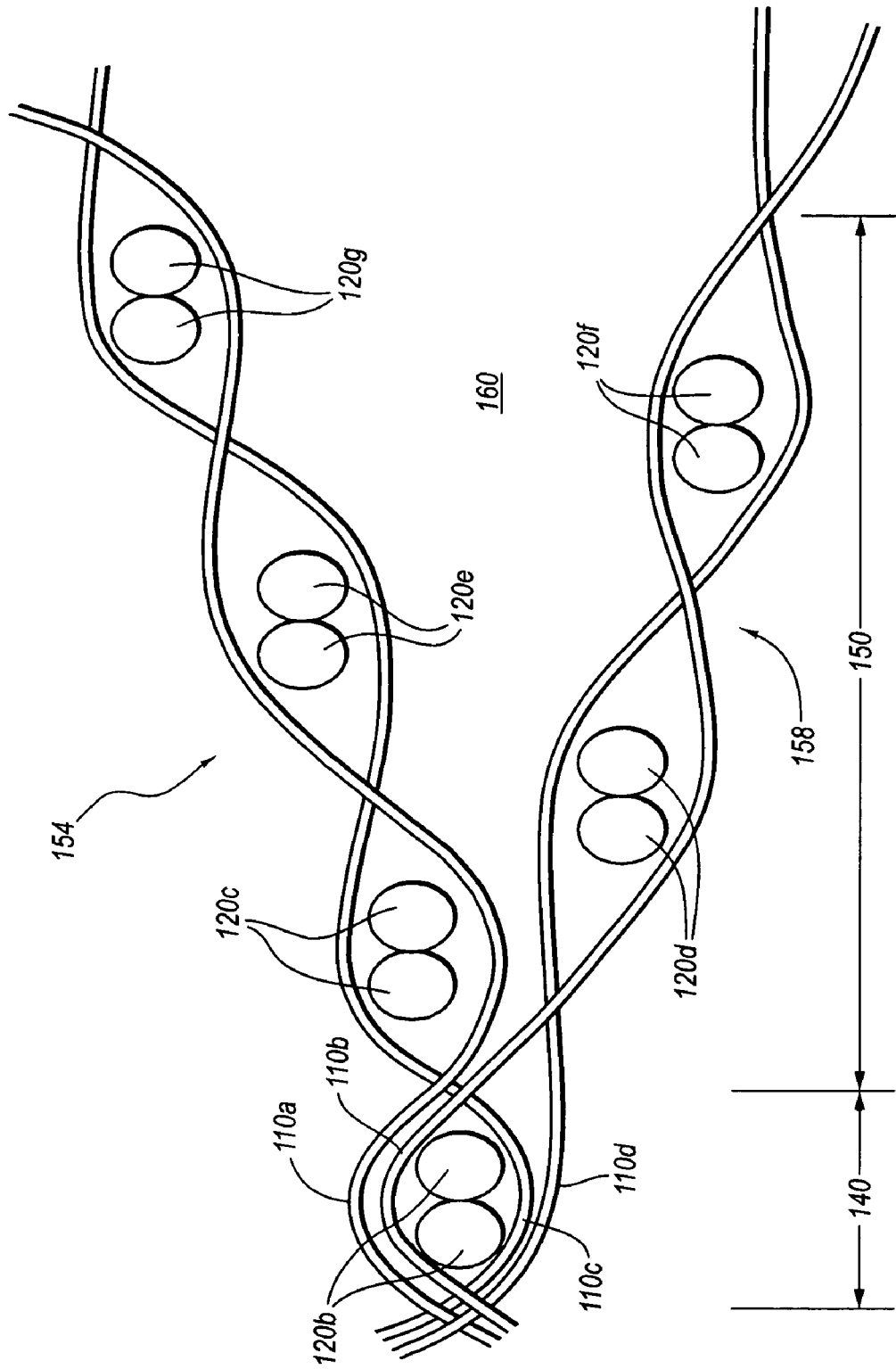

If the weaving process were to end at this point, FIG. 3G shows the result of six pairs 120 of weft yarns having been alternately woven into four warp yarn sets 110 in a parallel weaving process. As displayed, first woven fabric layer 154 comprises first and third warp yarn sets 110*a*, 110*c*. Also, second woven fabric layer 158 comprises second and fourth warp yarn sets 110*b*, 110*d*. The exact assigned number of the respective warp yarn sets of first and second woven fabric layers 154, 158 are only exemplary for ease of explanation, and are not meant to provide limitations to the scope of this disclosure. Nevertheless, it should be apparent that first and second woven fabric layers 154, 158 are separated and opposing in relation, thereby forming an inflatable space 160 therebetween. The weaving process may continue to form an inflatable fabric portion 150 of desired length, and through the pattern controlled by the computer of Jacquard Loom 10, may weave at least one, contiguous non-inflatable fabric portion 140.

It should be noted that use of the OPW process enables the weaving of both inflatable fabric portion 150 and non-inflatable fabric portion 140 from the same sets of warp yarns (110a, 110b, 110c, 110d) during a continuous weaving process. Note that each of the first and second woven fabric layers 154, 158 may be of varying lengths, if desired, to produce varying dimensions to parts of an inflatable airbag. This may still be accomplished through the same, continuous weaving process by simply continuing to weave one of the first and second woven fabric layers 154, 158 while stopping for a time the weaving of the other of the first and second woven fabric layers 154, 158.

Figure 4C:
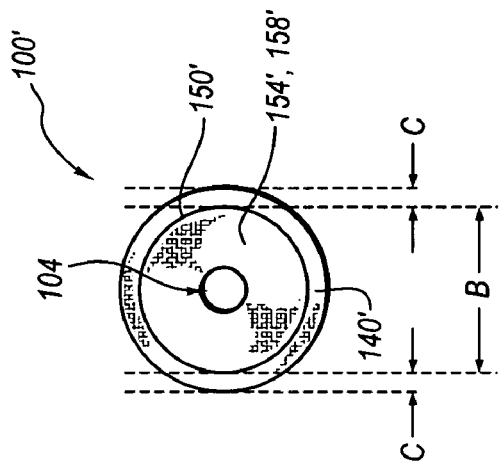
FIG. 4C is a plan view illustrating an example of one individual unit of the continuous fabric piece of FIG. 4A.
Figure 4A:
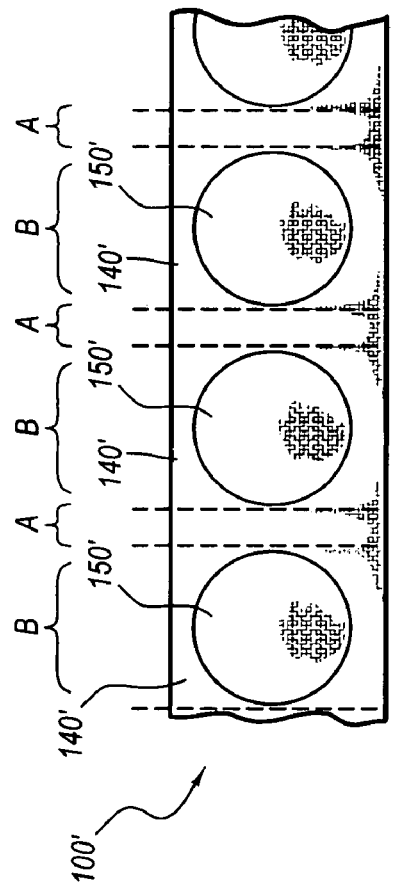
FIG. 4A is a plan view illustrating an example of a continuous piece of airbag fabric formed from repeatedly carrying out the method of FIGS. 3A-3G.
Figure 4B:
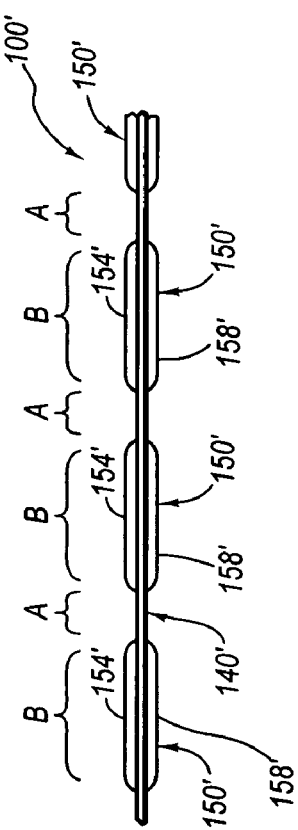
FIG. 4B is a side view of the continuous fabric piece of FIG. 4A.

FIG. 4A is a plan view illustrating an example of a continuous piece of double yarn (weft or warp) airbag fabric 100'. The airbag fabric 100' may be formed from repeatedly carrying out the method of FIGS. 3A-3G. FIG. 4B is a side view of the continuous piece of double yarn (weft or warp) airbag fabric 100' of FIG. 4A. Specifically, parts A of fabric 100' comprise non-inflatable fabric portions 140' that may be weaved such that warp yarn sets are interwoven about a plurality of pairs of weft yarns in a single, integrated piece of woven fabric 100'. In the alternative, parts A comprise non-inflatable fabric portions 140' that may be weaved such that weft yarn sets are interwoven about a plurality of pairs of warp yarns.

Parts B comprise portions of double-weft airbag fabric 100' wherein both non-inflatable fabric portions 140' and inflatable fabric portions 150' are woven simultaneously. This may be accomplished by using Jacquard Loom (10 of FIGS. 2-3G) and the desired pattern, i.e., in this embodiment, a circular one. Of course, patterns of varying sizes and shapes may be implemented to produce double (weft or warp) airbag fabric 100' for differing applications of protective airbags, as is discussed below with reference to FIG. 5.

FIG. 4C is a plan view illustrating an example of one individual unit 100' of the continuous piece of double yarn (weft or warp) airbag fabric 100' of FIGS. 10 and 11, displaying also a gas-introducing aperture 104. As displayed, at least a width C of non-inflatable fabric portion 140' is retained about inflatable fabric portion 150' during the removal process from the continuous sheet of double weft airbag fabric 100', which may be accomplished through cutting or melting or other methods known in the art. Use of melting may help to prevent fraying.

Gas-introducing aperture 104 may be formed through either of the first or second opposing, woven fabric layers 154', 158'. Gas-introducing aperture 104 may also be defined by both first and second opposing, woven fabric layers 154', 158', such as at a location where first and second woven fabric layers 154', 158' meet and are void of non-inflatable fabric portion 140' (see, for example, FIG. 5). Gas introducing aperture 104 may be formed during the weaving process, or may be formed later, such as through cutting, melting, and the like. Once formed, gas introducing aperture 104 also provides a space through which individual unit 100' may be turned inside out so that width C of non-inflatable fabric portion 140' lies within the resultant airbag. Such an airbag may be employed in the steering column of a vehicle or in the front display panel, for instance.

Figure 5:
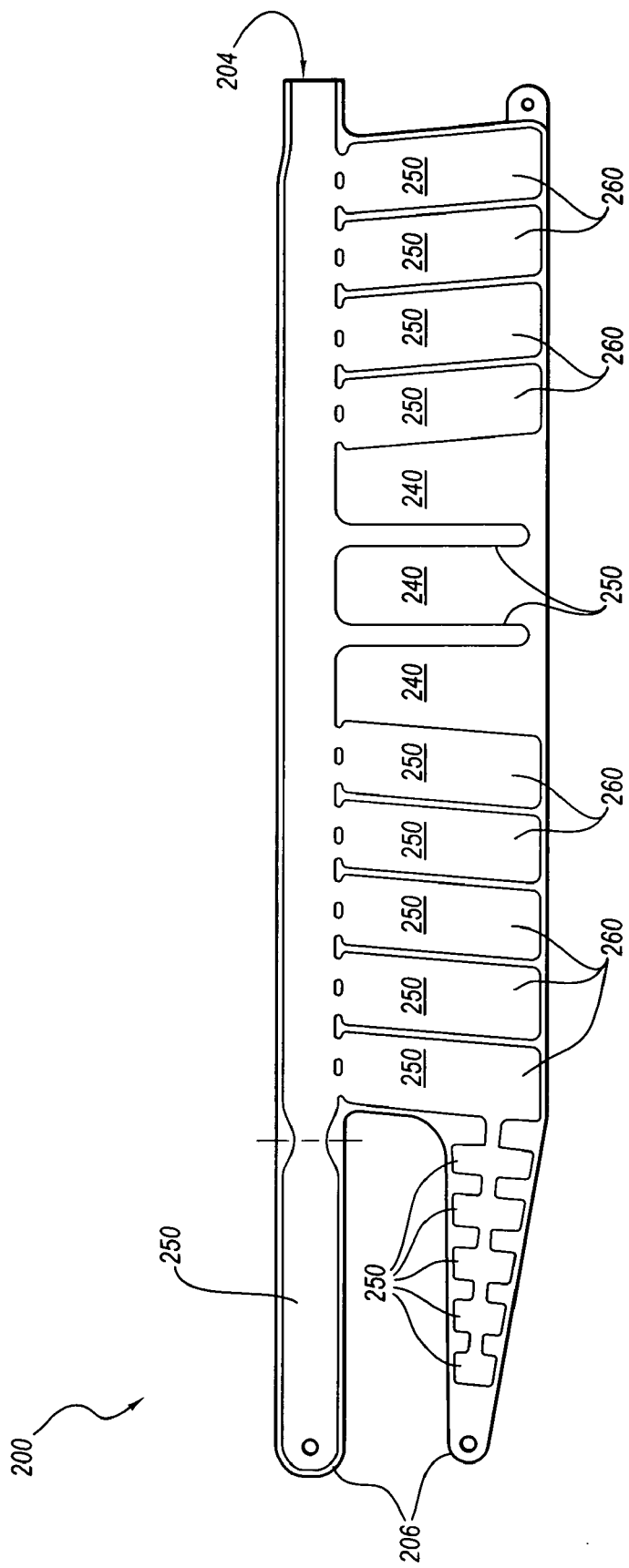
FIG. 5 is a sectional side view of one embodiment of an airbag curtain when the inflatable fabric portions are in a flat and unpacked state.

FIG. 5 is a sectional side view of one embodiment of an inflatable airbag curtain 200 when the inflatable fabric portions 250 are in a flat and unpacked state. Inflatable airbag curtain 200 may be formed from a combination of inflatable fabric portions 250 and at least one non-inflatable fabric portion 240, creating a plurality of cells 260 according to a specific, desired pattern of inflation. Within airbag curtain 200 may be formed a horizontally extending gas duct to which a gas generator may be coupled to create a path through which the plurality of substantially vertically oriented cells 260 may be inflated. Thus, a gas-introducing aperture 204 may be defined between first and second woven fabric layers (not shown) at the mouth of the gas duct, to which the gas generator may be coupled to inflate inflatable fabric portion 250 and inflatable cells 260.

Inflatable airbag curtain 200 may be packed by inserting into a housing or recess (not shown), which may extend along the roof rail of a vehicle to protect occupants especially from lateral impact with the vehicle's interior. Spurs or extensions 206 may be formed in inflatable airbag curtain 200 to pliably conform to the curvature of the back portion of the door frame, while providing further protection to a backseat passenger. Inflatable airbag curtain 200, as displayed, is but one of many embodiments of possible inflatable airbag curtains, which may be formed from double yarn (weft or warp) airbag fabric 100, or the method of making double yarn (weft or warp) airbag fabric 100, as discussed herein.

It will be apparent to those having skill in the art that changes may be made to the details of the above-described embodiments without departing from the underlying principles of the invention. Various modifications and improvements of the embodiments specifically disclosed in the description above are within the scope of the appended claims. The scope of the invention is therefore defined by the following claims.

What is claimed is:

1. A woven, double-yarn fabric for an inflatable airbag, the fabric comprising:
 a non-inflatable fabric portion comprising a single, woven fabric layer; and
 an inflatable fabric portion surrounded by the non-inflatable fabric portion;
  wherein the inflatable fabric portion comprises a first woven fabric layer and a second woven fabric layer that is opposite from the first woven fabric layer to define at least one inflatable cell to be inflated;
  wherein the opposing woven fabric layers of the inflatable fabric portion are formed from a plurality of first yarns forming a first, second, third, and fourth sets of first yarns, and a plurality of second yarns oriented substantially laterally to the plurality of first yarns;
  wherein the first set of first yarns is woven under a first adjacent pair of second yarns while the third set of first yarns is woven over the first adjacent pair of second yarns, and the first set of first yarns is woven over a second adjacent pair of second yarns while the third set of first yarns is woven under the second adjacent pair of second yarns, forming a first weaving pattern, the first weaving pattern being repeated to form the first woven fabric layer; and
  wherein the second set of first yarns is woven under a third adjacent pair of second yarns while the fourth set of first yarns is woven over the third adjacent pair of second yarns, and the second set of first yarns woven over a fourth adjacent pair of second yarns while the fourth set of first yarns is woven under the fourth adjacent pair of second yarns, forming a second weaving pattern, the second weaving pattern being repeated to form the second woven fabric layer; and wherein the non-inflatable fabric portion is formed through weaving the first and second sets of first yarns over a fifth adjacent pair of second yarns while the third and fourth sets of first yarns are woven under the fifth adjacent pair of second yarns, and weaving the first and second sets of first yarns under a sixth adjacent pair of second yarns while the third and fourth sets of first yarns are woven over the sixth pair of second yarns, forming a third weaving pattern, the third weaving pattern being repeated to form the single, woven fabric layer.

2. The fabric of claim 1, wherein the plurality of first yarns comprise warp yarns, and the plurality of second yarns comprise weft yarns.

3. The fabric of claim 1, wherein the plurality of first yarns comprise weft yarns, and the plurality of second yarns comprise warp yarns.

4. The fabric of claim 1, wherein the two opposing fabric layers are formed concurrently in a continuous weaving process.

5. The fabric of claim 1, wherein the first adjacent pair of second yarns is neighboring to the second adjacent pair of second yarns, and wherein the third adjacent pair of second yarns is neighboring to the fourth adjacent pair of second yarns.

6. The fabric of claim 1, wherein the fifth adjacent pair of second yarns is neighboring to the sixth adjacent pair of second yarns.

7. The airbag of claim 1, wherein the first and second woven fabric layers each have lengths that are substantially equivalent.

8. The airbag of claim 1, wherein the inflatable fabric portion defines a gas-introducing aperture in fluid communication with the at least one inflatable cell.

9. A method of weaving a double-yarn fabric for inflatable airbags, comprising:

obtaining a plurality of first yarns forming a first, second, third, and fourth sets of first yarns and a plurality of second yarns;

forming a first woven fabric layer via a first weaving pattern comprising weaving the first set of first yarns under a first adjacent pair of second yarns, weaving the third set of first yarns over the first adjacent pair of second yarns, alternately weaving the first set of first yarns over a second adjacent pair of second yarns and alternately weaving the third set of first yarns under the second adjacent pair of second yarns, and then repeatedly weaving and alternately weaving the first set of first yarns and the third set of first yarns, substantially laterally, with respect to additional pairs of second yarns;

forming a second woven fabric layer via a second weaving pattern comprising weaving the second set of first yarns under a third adjacent pair of second yarns, weaving the fourth set of first yarns over the third adjacent pair of second yarns, alternately weaving the second set of first yarns woven over a fourth adjacent pair of second yarns and alternately weaving the fourth set of first yarns is woven under the fourth adjacent pair of second yarns, and then repeatedly weaving and alternately weaving the second set of first yarns and the fourth set of first yarns, substantially laterally, with respect to additional pairs of second yarns; and forming a single, woven fabric layer, to provide a non-inflatable fabric portion, via a third weaving pattern comprising weaving the first and second sets of first yarns over a fifth adjacent pair of second yarns and weaving the third and fourth sets of first yarns under the fifth adjacent pair of second yarns, alternately weaving the first and second sets of first yarns under a sixth adjacent pair of second yarns and alternately weaving the third and fourth sets of first yarns over the sixth adjacent pair of second yarns, and then repeatedly weaving and alternately weaving the first and second sets of first yarns and the third and fourth sets of first yarns, substantially laterally, with respect to additional pairs of second yarns;

wherein the first woven fabric layer is opposite from and spaced apart from the second woven fabric layer;

wherein the first woven fabric layer and the second woven fabric layer comprise an inflatable fabric portion that is surrounded by the non-inflatable fabric portion;

wherein the first woven layer and the second woven layer define at least one inflatable cell to be inflated; and wherein the first woven fabric layer and the second woven fabric layer are woven with the single, woven fabric layer to form a continuous piece of fabric for use in inflatable airbags.

10. The method of claim 9, wherein the sets of first yarns comprise sets of warp yarns, and wherein the second yarns comprise weft yarns.

11. The method of claim 9, wherein the sets of first yarns comprise sets of weft yarns, and wherein the second yarns comprise warp yarns.

12. The airbag of claim 9, wherein the first and second opposing woven fabric layers define a gas-introducing aperture.

13. The method of claim 10, wherein the two opposing fabric layers are formed concurrently in a continuous weaving process.

14. The method of claim 10, wherein the weft yarns in each pair of second yarns move together simultaneously together while being woven in the first weaving pattern:

with the first set of warp yarns and the third set of warp yarns.

15. The method of claim 10, wherein the alternate weaving of sets of warp yarns with weft yarns occurs through inserting the weft yarns through the sets of warp yarns before each alternate weaving of the warp yarn sets.

* * * * *